Patented Feb. 23, 1954

2,670,357

UNITED STATES PATENT OFFICE 2,670,357

6 BETA, 17 ALPHA-DIHYDROXY-4-PREG-NENE-3,20-DIONE AND ESTERS THEREOF

Herbert C. Murray, Hickory Corners, and Durey H. Peterson, Kalamazoo, Mich., assignors to The Upjohn Company, Kalamazoo, Mich., a corporation of Michigan No Drawing. Application July 1, 1952, Serial No. 296,721

12 Claims. (Cl. 260—397.4)

The present invention relates to new and useful steroid compounds and more specifically, to 6β,17α-dihydroxyprogesterone, 6β-acyloxy-17α-hydroxy-4-pregnene-3,20-diones and to methods for the production thereof.

It is an object of this invention to provide 6β,17α-dihydroxyprogesterone and 6β-acyloxy-17α-hydroxy-4-pregnene-3,20-diones, new and useful compositions of matter having pharmacological activity and being additionally useful in the synthesis of various oxygenated steroids. Another object is to provide a process for the preparation of these compounds. Other objects of the invention will be apparent to those skilled in the art to which this invention pertains.

The novel compounds of the present invention are represented by the following formula:

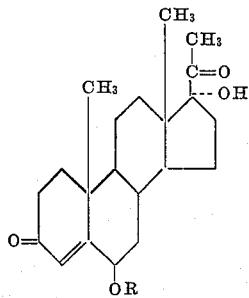

wherein R is hydrogen or an acyl group of a carboxylic acid.

These compounds are useful as intermediates in the synthesis of pharmacologically active steroids. For example, upon subjecting 6β-benzoxy-17α-hydroxy-4-pregnene-3,20-dione to pyrolysis and then reducing the resulting compound, 17α-hydroxy-4,6-pregnadiene-3,20-dione, with hydrogen in the presence of a palladium-charcoal catalyst, the known adrenal steroid, 17α-hydroxyprogesterone, is obtained. Acetylation of 6β,17α-dihydroxyprogesterone at the 6-position followed by oxidation and hydrolysis produces the known 6-hydroxy-4-androstene-3,17-dione.

In addition, the 6β,17α-dihydroxyprogesterone and 6β- acyloxy-17α- hydroxy-4- pregnene- 3,20-diones exhibit anesthetic, corticoid, folliculoid, luteoid, and anti-hypertensive activity.

The 6β-acyloxy-17α-hydroxy-4-pregnene-3,20-diones are prepared by the procedures set forth in the following examples, by reacting 6β,17α-dihydroxy-4-pregnene-3,20-dione with ketene, ketenes of selected acids, selected acids, and anhydrides or acid chlorides in an organic solvent such as pyridine or the like. Representative mono-esters of 6β,17α-dihydroxy-4-pregnene-3,20-dione which are prepared in this manner include, especially, one to eight carbon atom carboxylic acid acyloxy esters of saturated or unsaturated aliphatic or cycloaliphatic, aryl, arylalkyl, alkaryl, mono-, di- or polycarboxylic acids which form ester groups such as, for example, formyloxy, acetoxy, propionyloxy, dimethylacetoxy, trimethylacetoxy, dimethyl propionylacetoxy, butyryloxy, valeryloxy, hexanoyloxy, heptanoyloxy, octanoyloxy, benzoxy, phenylacetoxy, toluoyloxy, cyclopentylformyloxy, β-cyclopentylpropionyloxy, acrylyloxy, cyclohexylformyloxy, the half and di-esters of malonic, maleic, succinic, glutaric, adipic acids, and the like. The acyl groups may also contain non-interfering substituents, such as mono- or poly-halo, chloro, bromo, hydroxy, methoxy and the like.

The 6β,17α-dihydroxyprogesterone, may be prepared by subjecting 17α-hydroxy-progesterone to the action of a fungus of the order Mucorales as set forth in the applications of Murray and Peterson, Serial No. 180,496, filed August 19, 1950, now abandoned; Serial No. 293,656, filed June 14, 1952, now abandoned; and Serial No. 272,944, filed February 23, 1952, issued on July 8, 1952, as United States Patent 2,602,769, of which this application is a continuation-in-part.

The following preparation and examples are illustrative of the objects, processes and products of the present invention, but are not to be construed as limiting.

*Example 1.—6β,17α-dihydroxyprogesterone*

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Two liters of this sterilized medium was inoculated with *Rhizopus nigricans* minus strain, American Type Culture Collection No. 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24-hour growth of *Rhizopus nigricans* minus strain was added one gram of 17α-hydroxyprogesterone in 25 milliliters of acetone to provide a suspension of the steroid in the culture. After an additional 152-hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extract with about three to five grams of anhydrous sodium sulfate per liter of solvent and filtering, the solvent was removed by distillation. The residue was dissolved in a minimum of methylene chloride, filtered and the solvent was then evaporated. The resulting extract weighing 1.685 grams was dissolved in 100 milliliters of ethylene dichloride and chromatographed over 150 grams of Florisil synthetic magnesium silicate. Prior to the addition of the extract, the column was washed with 600 milliliters of acetone followed by 600 milliliters of ethylene dichloride. Solvents in 220-milliliter portions were used. Results are given in Table I.

Another run was made as above and the corresponding chromatograph fractions were combined for purposes of isolation.

Fractions 13 to 17 were recrystallized from methanol by the addition of ether to yield 260 milligrams of 11α,17α-dihydroxy-progesterone which melted at 220 to 222 degrees centigrade, had an optical rotation $[\alpha]_D^{24}$ of plus 76 degrees (1.1323 in chloroform) and an ultraviolet extinction $k_{243}$ of 46.67.

*Analysis.*—Calculated for $C_{21}H_{30}O_4$: C, 72.82; H, 8.73. Found: C, 73.18; H, 8.76; C, 72.85; H, 8.47.

The mother liquors of fractions 13 to 17 and fractions 11, 12 and 18 to 20 were combined and rechromatographed in the same manner over 150 grams of Florisil thus yielding another 102 milligrams of 11α,17α-dihydroxyprogesterone.

Fraction 10 yielded a second compound, 6β,17α-dihydroxyprogesterone melting at 256 to 258 and 228 to 235 degrees centigrade, analyzing as $C_{21}H_{30}O_4$ and having an optical rotation $[\alpha]_D^{23}$ of plus four degrees (.775 gram in chloroform).

TABLE I

| Fraction | Solvent | Eluate Solids, Milligrams |
|---|---|---|
| 1 | ethylene dichloride | 105.5 |
| 2, 3 | ethylene dichloride-acetone 25:1 | 177.0 |
| 4 | ethylene dichloride-acetone 15:1 | 30.0 |
| 5 | do | 88.5 |
| 6–9 | ethylene dichloride-acetone 12:1 | 225.5 |
| 10 | ethylene dichloride-acetone 10:1 | 23.5 |
| 11, 12 | do | 73.0 |
| 13–16 | ethylene dichloride-acetone 8:1 | 316.5 |
| 17 | ethylene dichloride-acetone 5:1 | 129.5 |
| 18–20 | do | 167.0 |
| 21–23 | ethylene dichloride-acetone 2:1 | 134.5 |
| 24–26 | acetone | 57.0 |

*Example 2.—6β-acetoxy-17α-hydroxy-4-pregnene-3,20-dione*

Five milliliters of acetic anhydride was added to a solution containing 370 milligrams of 6β,17α-dihydroxyprogesterone dissolved in five milliliters of pyridine. The mixture was stirred and maintained at room temperature for sixteen hours. It was then poured into 100 grams of crushed ice and water. An oil, which separated out of the solution became crystalline upon standing. The crystalline material recovered by filtration, melted at 120 to 150 degrees centigrade. The crystalline material was dissolved in twenty milliliters of benzene and chromatographed over twenty grams of acid washed alumina which had been heated to 120 degrees centigrade. Twenty-milliliter portions of solvents were used for development in accordance with Table II.

TABLE II

| Fraction | Solvent | Eluate Solids, Milligrams |
|---|---|---|
| 1 | Benzene | |
| 2 | do | |
| 3 | Benzene plus five percent ether | |
| 4 | do | |
| 5 | Benzene plus ten percent ether | |
| 6 | do | |
| 7 | Benzene plus fifty percent ether | |
| 8 | do | |
| 9 | Ether | |
| 10 | do | |
| 11 | Ether plus five percent chloroform | |
| 12 | do | |
| 13 | Ether plus ten percent chloroform | 1 |
| 14 | do | 1 |
| 15 | Ether plus fifty percent chloroform | 18 |
| 16 | do | |
| 17 | Chloroform | 137 |
| 18 | do | 111 |
| 19 | Chloroform plus five percent acetone | 23 |
| 20 | do | 5 |
| 21 | Chloroform plus ten percent acetone | |
| 22 | do | |
| 23 | Chloroform plus fifty percent acetone | 1 |
| 24 | do | 2 |
| 25 | Acetone | |
| 26 | do | |
| 27 | Acetone plus five percent methanol | |
| 28 | do | |
| 29 | Acetone plus ten percent methanol | |
| 30 | do | |
| 31 | Acetone plus fifty percent methanol | 1 |
| 32 | do | |
| 33 | Methanol | 1 |
| 34 | do | 1 |

Fractions 16 to 20, inclusive were combined and evaporated to dryness. On recrystallization from ether and Skellysolve B petroleum ether, 200 milligrams of crystalline material which softened at 65 to 75 degrees centigrade and melted at 155 to 170 degrees centigrade was obtained. This product was then dissolved in a small volume of acetone and water was added thereto until the material just began to crystallize. On cooling and refrigerating, additional crystalline material was formed. The crystalline product softened at 75 to 85 degrees centigrade, resolidified at about 130 degrees centigrade and melted at 180 to 190 degrees centigrade. On recrystallization from acetone by the addition of water thereto and subsequent cooling, 6β-acetoxy-17α-hydroxyprogesterone, having a melting point of 185 to 190.5 degrees centigrade was obtained. The structure of this compound was confirmed by infrared spectra.

Using an alternative procedure, the reaction product was purified by dissolving in warm acetone and then slowly adding water thereto until the solution became turbid. The crystalline material obtained in this manner was recrystallized twice. The product thus obtained was similar to that obtained using the chromatographic procedure described above.

Example 3.—6β-formyloxy-17α-hydroxy-4-pregnene-3,20-dione

Using the procedure described in Example 2, 6β-formyloxy-17α-hydroxy-4-pregnene-3,20-dione is prepared by reacting 6β,17α-dihydroxy-4-pregnene-3,20-dione with formic acid.

Example 4.—6β-propionyloxy-17α-hydroxy-4-pregnene-3,20-dione

Using the procedure described in Example 2, 6β-propionyloxy-17α-hydroxy-4-pregnene-3,20-dione is prepared by reacting 6β,17α-dihydroxy-4-pregnene-3,20-dione with propionic anhydride in the presence of pyridine.

Example 5.—6β-(β-cyclopentyl)propionyloxy-17α-hydroxy-4-pregnene-3,20-dione

Using the procedure described in Example 2, 6β-(β-cyclopentyl)propionyloxy-17α-hydroxy-4-pregnene-3,20-dione is prepared by reacting 6β,17α-dihydroxy-4-pregnene-3,20-dione with β-cyclopentylpropionyl chloride in pyridine.

Example 6.—6β-benzoxy-17α-hydroxy-4-pregnene-3,20-dione

Using the procedure described in Example 2, 6β-benzoxy-17α-hydroxy-4-pregnene-3,20-dione is prepared by reacting 6β,17α-dihydroxy-4-pregnene-3,20-dione with benzoyl chloride in the presence of pyridine.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A compound represented by the graphic formula:

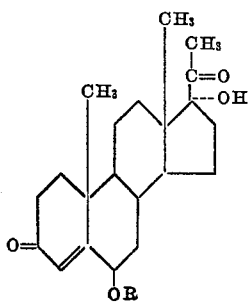

wherein R is selected from the radicals hydrogen and hydrocarbon-carboxylic acyl radical containing less than nine carbon atoms.

2. 6β,17α-dihydroxyprogesterone.

3. 6β-acyloxy-17α-hydroxy-4-pregnene-3,20-diones wherein the acyl group is a hydrocarbon carboxylic acid acyl radical having less than nine carbon atoms.

4. 6β-acetoxy-17α-hydroxy-4-pregnene-3,20-dione.

5. 6β-propionyloxy-17α-hydroxy-4-pregnene-3,20-dione.

6. 6β-(β-cyclopentyl)propionyloxy-17α-hydroxy-4-pregnene-3,20-dione.

7. 6β-benzoxy-17α-hydroxy-4-pregnene-3,20-dione.

8. A process for the production of 6β-acyloxy-17α-hydroxy-4-pregnene-3,20-diones which comprises reacting 6β,17α-dihydroxy-4-pregnene-3,20-dione with an acylating agent to form 6β-acyloxy-17α-hydroxy-4-pregnene-3,20-diones.

9. A process for the production of a 6β-acyloxy-17α-hydroxy-4-pregnene-3,20-dione which comprises reacting 6β,17α-dihydroxy-4-pregnene-3,20-dione with a carboxylic acid to form a 6β-acyloxy-17α-hydroxy-4-pregnene-3,20-dione.

10. A process for the production of a 6β-acyloxy-17α-hydroxy-4-pregnene-3,20-dione which comprises reacting 6β,17α-dihydroxy-4-pregnene-3,20-dione with a carboxylic acid anhydride to form a 6β-acyloxy-17α-hydroxy-4-pregnene-3,20-dione.

11. A process for the production of a 6β-acyloxy-17α-hydroxy-4-pregnene-3,20-dione which comprises reacting 6β,17α-dihydroxy-4-pregnene-3,20-dione with a carboxylic acid acyl halide to form a 6β-acyloxy-17α-hydroxy-4-pregnene-3,20-dione.

12. A process for the production of 6β-acetoxy-17α-hydroxy-4-pregnene-3,20-dione which comprises reacting 6β,17α-dihydroxy-4-pregnene-3,20-dione with acetic anhydride to form 6β-acetoxy-17α-hydroxy-4-pregnene-3,20-dione.

HERBERT C. MURRAY.
DUREY H. PETERSON.

References Cited in the file of this patent
UNITED STATES PATENTS

| Number | Name | Date |
|---|---|---|
| 2,337,564 | Marker | Dec. 28, 1943 |
| 2,352,848 | Marker | July 4, 1944 |
| 2,366,204 | Marker | Jan. 2, 1945 |